United States Patent
Rotier

[11] 3,836,953
[45] Sept. 17, 1974

[54] PROPAGATION SPEED DETERMINING APPARATUS

[75] Inventor: Donald J. Rotier, St. Paul, Minn.

[73] Assignee: Honeywell Inc., Minneapolis, Minn.

[22] Filed: Mar. 30, 1973

[21] Appl. No.: 346,560

[52] U.S. Cl. .............................. 340/16 R, 340/5 S
[51] Int. Cl. ............................................. G01s 5/18
[58] Field of Search........... 340/5 R, 6 R, 16 R, 5 S; 235/150.27, 151.32, 189; 343/112 C; 181/.5 AP

[56] References Cited
UNITED STATES PATENTS

| | | |
|---|---|---|
| 2,753,542 | 7/1956 | Rod et al. ........................ 340/3 R |
| 3,569,920 | 3/1971 | Antman ............................. 340/6 R |
| 3,664,722 | 5/1972 | Kiji et al. ...................... 340/16 UX |

Primary Examiner—Richard A. Farley

[57] ABSTRACT

Aline-of-sight determining system using ultrasonic transducers mounted on a helmet and on a reference object, including means for determining the propagation speed of ultrasonic signals. The means for determining propagation speed uses a known distance between transducers and compares the known distance with a distance calculated using an assumed propagation speed value to generate a more accurate value.

11 Claims, 5 Drawing Figures

PROPAGATION SPEED DETERMINING APPARATUS

BACKGROUND OF THE INVENTION

This invention relates generally to systems in which acoustical energy is transmitted between transducers and the time required for transmission is used to determine the spatial orientation of the transducers. More particularly, the invention concerns a method and apparatus for determining the propagation speed of acoustical energy signals for application in such systems.

As used in this specification, the term "acoustical energy signal" shall mean a signal from any portion of the sound spectrum, whether or not audible, and may include either a sonic or ultrasonic frequency signal. The term "acoustical energy transducer" in this specification shall refer to a transmitter or receiver of acoustical energy signals. Furthermore "propagation speed" as used herein is defined as the rate of change of position of an acoustical energy wave front or other portion of an acoustical energy signal being transmitted through a physical medium.

Prior art systems for determining spatial orientation of objects with respect to one another have used acoustical energy transducers mounted on the objects, measured transit times required for propagation of acoustical energy signals between the objects, and calculated relative position of the objects using these transit times and an assumed propagation speed. A specific example of such a system is a head position determination system with ultrasonic transducers mounted on a reference object and on a helmet worn by the observer whose head position is being determined. One such system is described in a paper by Ivan E. Sutherland entitled "A Head Mounted Three-Dimensional Display," published in *Proceedings of the Fall Joint Computer Conference*, (1968), pages 760–761. Other prior work using an ultrasonic position sensing device is described in a paper entitled "The Lincoln Wand," by Lawrence G. Roberts, published in the *Proceedings of the Fall Joint Computer Conference*, (1966), pages 223–227. At page 227, Roberts identifies the existence of errors in the position determining system output caused by changes in speed of sound. Roberts' error analysis indicated that changes in temperature of the medium caused small changes in speed of sound.

When acoustical energy transducer head position determining systems are applied to line-of-sight measurements of a pilot in an aircraft or other environments outside the laboratory, the errors caused by variations in temperature and pressure may become very significant. Therefore, if a line-of-sight determining system is to be used by an observer in conjunction with vision aiding devices such as a low-light-level TV camera slaved to the line of sight, or in fact in any non-laboratory practical application, some correction for propagation speed variations in the medium may be required.

Various applications using transmission of acoustical energy signals to determine position and orientation of objects with respect to one another have resulted in attempts to solve this problem. A typical example of the prior art approach to variations in propagation speed is shown in U.S. Pat. No. 2,841,775 to N.B. Saunders. FIG. 1 of the Saunders' patent discloses receiving and transmitting transducers, in conjunction with other circuitry, used solely for the purpose of generating a propagation speed correction to the main apparatus described in the Saunders' patent. Briefly, the compensation in Saunders is achieved by utilizing a set of transducers separate from the set of transducers used for the main system function. The separate set of transducers is spaced a known distance apart. The time required for transmission of a signal from one to the other of these transducers is used to determine the propagation speed in the medium. This determined propagation speed is then used in the primary apparatus. In Saunders the primary apparatus transmits sonic signals from a ship and receives signals reflected from irregularities in the transmission medium. The reflected signals are shifted in frequency due to the Doppler effect. The shift and the propagation speed of the signals is used to calculate ship velocity.

FIG. 6 of U.S. Pat. No. 3,496,524 to G. Stavis et al. shows a propagation speed determining scheme similar to that in Saunders, with separate transducers and a sample of the medium interposed between them.

These prior art propagation speed determining systems have a number of disadvantages. The use of transducers in addition to those in the main system apparatus and the cell containing the additional transducers occupies valuable space. The requirement of additional transducers and associated hardware increases the total cost and complexity of the system. A further associated hardware increases the total cost and complexity of the system. A further disadvantage is that differences in environmental conditions in the region of the transducers measuring propagation speed and those in the main apparatus will affect the accuracy of the propagation speed determination.

It is therefore an important object of the present invention to provide a method and apparatus for determining propagation speed of acoustical energy signals for use in a system having acoustical energy transducers, in which the transducers used for the main system function of determining relative position, velocity, or acceleration may also be used to provide information for propagation speed determination.

Another important object is to provide a method and apparatus for propagation speed determination in which errors due to differences in environmental conditions of the transducers used for the main system functions measurements and trasducers used to obtain propagation speed information are essentially eliminated.

SUMMARY OF THE INVENTION

These and other objects are attained in apparatus for determining relative spatial orientation of two objects utilizing acoustical energy transducers positioned on each object, means for transmitting acoustical energy from transducers on one object to transducers on the other object, means for measuring transit times required for propagation of these signals, and means for calculating relative spatial orientation using the transit times and an assumed propagation speed in the medium. The objects are attained by improved propagation speed determining apparatus which comprises a first pair of acoustical energy transducers, separated a known distance from one another and affixed to one of the objects. First computing means in the apparatus generates an output signal related to the known distance between these transducers. The first computing means output signal is generated using the measured transit times and an assumed or nominal propagation speed value. A signal generating means generates an output signal whose value is a mathematical function of the known distance. The first computing means output signal and the signal generating means output signal are used by a second computing means for calculation of a corrected propagation speed value, without use of external transducers and circuitry.

BRIEF DESCRIPTION OF THE DRAWINGS

Other objects and advantages of the invention will become apparent upon a reading of the following detailed description and upon reference to the drawings in which.

While the invention will be described in connection with a preferred embodiment and method, it will be understood that the invention is not limited to the process or embodiment described. On the contrary, all alternatives, modifications and equivalents within the spirit and broad scope of the invention as defined by the appended claims are covered.

DETAILED DESCRIPTION OF THE INVENTION

Figure 1:
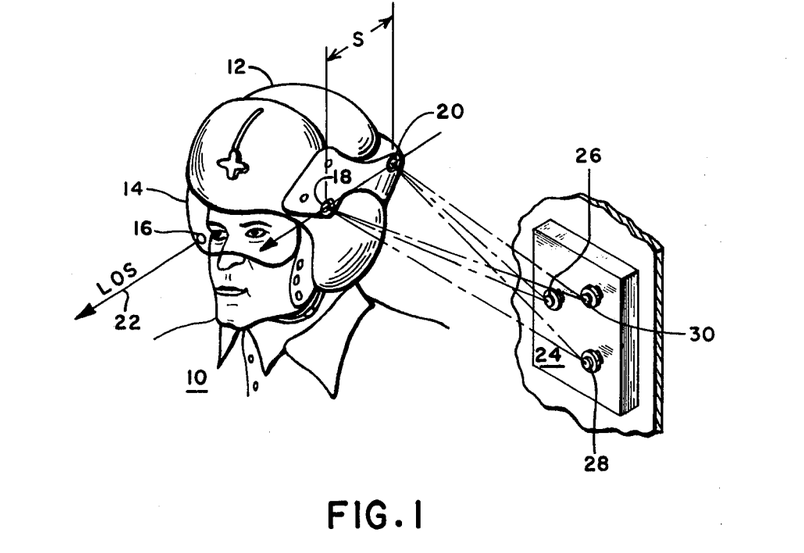
FIG. 1 is a perspective view of a portion of a line-of-sight determining system with which the present invention may be used.

FIG. 1 shows the basic external mechanical elements of a line-of-sight determining system using acoustical energy transducers. In FIG. 1, an observer 10 is shown wearing a helmet 12. Helmet 12 has a convex visor 14, on which a reticle pattern 16 is projected. The reticle pattern 16 may be a collimated image which appears to observer 10 to be superimposed at infinity on the scene of the outside world. It is not essential to the line-of-sight determining system that such a visor reticle pattern be used. A conventional cross hair sight could also be used. Two acoustical energy transducers 18 and 20 are affixed to helmet 12. While the system could be operational with either transmitters or receivers, for simplicity in discussion an embodiment with transmitters on the helmet is described here. In one successful line-of-sight determining system built and demonstrated, these transmitters were ultrasonic transducers having a resonant frequency of 75 KHz.

Transmitters 18 and 20 are separated by a known distance S. This means that in mounting the transmitters to helmet 12, care is taken to place them a predetermined distance from one another.

In addition to being placed a predetermined distance from one another, transmitters 18 and 20 are also placed in a predetermined relationship with respect to reticle pattern 16. Transmitters 18 and 20 are placed so that a straight line joining the centers of their surfaces will be parallel to a line-of-sight 22 of observer 10, which line of sight is defined by the reticle pattern and one eye of observer 10. It is not necessary to an operative system that the line defined by the centers of transmitters 18 and 20 be parallel to the line-of-sight 22, but it is essential that a defined predetermined angular relationship between these two lines exist. Line-of-sight 22 is represented in FIG. 1 by an arrow marked "LOS". Through the remainder of this specification, "LOS" will be used to refer to the term line-of-sight. This acronym is well known in the LOS determining system art.

Also present in FIG. 1 is an acoustical energy transducer assembly generally designated 24. Acoustical energy transducer assembly 24 includes three transducers 26, 28, and 30. In the particular embodiment shown, these transducers will be receivers 26, 28, and 30. Assembly 24 is shown attached to a surface, which represents the reference object with respect to which LOS of the observer is defined. In a typical application of the system, the acoustical energy transducer assembly 24 is mounted to a portion of an aircarft cockpit and the observer 10 is an aircraft pilot.

In FIG. 1 a set of three alternately dotted and dashed lines emanate from each of the transmitters 18 and 20 and terminate at receivers 26, 28, and 30. These lines represent pulsed acoustical energy. signals which are transmitted from each transmitter and received at each of the three receivers. During LOS determining system operation, the transit or propagation times required for these signals to travel from a transmitter to each of receivers 26, 28, and 30 are utilized by an associated computer for calculation of the coordinates of each of transmitters 18 and 20. In order to calculate these coordinates, the propagation speed of the signals as well as propagation time must be known. The propagation speed determining apparatus of the present invention yields the propagation speed required for the calculation of these coordinates and LOS.

Figure 2:
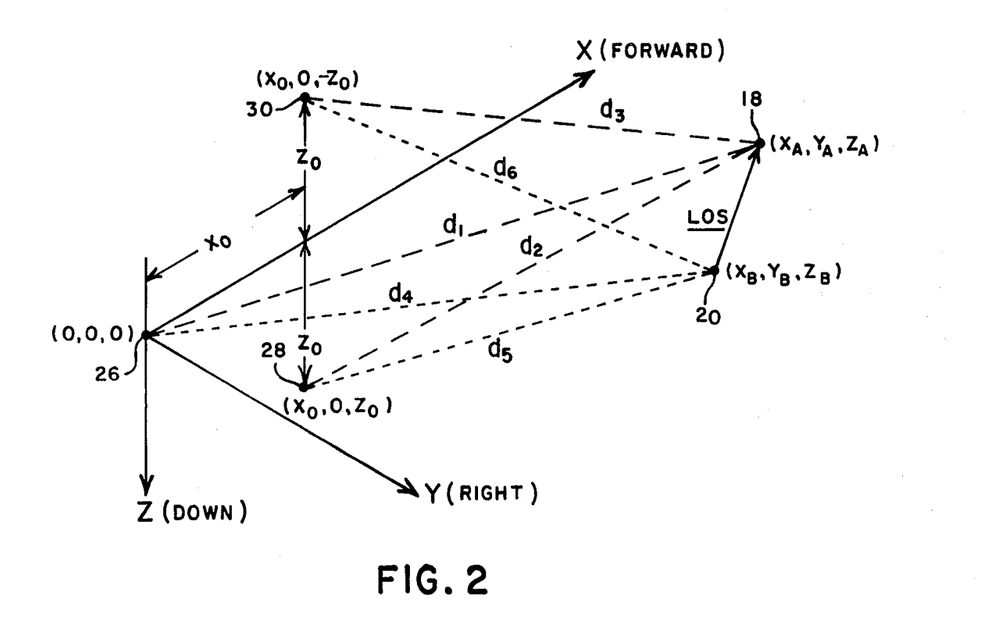
FIG. 2 is a drawing of a Cartesian coordinate system showing acoustical energy transducer locations so that the geometry underlying the line-of-sight determining system of FIG. 1 may be better understood.

FIG. 2 shows the geometrical relationship between transmitters 18 and 20 mounted on one side of helmet 12 and the triad of receivers 26, 28, and 30 which are included in assembly 24. In FIG. 2, a right-hand Cartesian coordiante system appears. The positive X, Y, and Z axes of this coordinate system are labelled. For ease in understanding the relationship of this coordinate system to the observer, helmet, and assembly shown in FIG. 1, each axis is marked with the direction which observer 10 would attribute to it. The positive X axis is marked "(forward)" since it points generally straight ahead of observer 10. Similarly, the positive Y axis is marked "(right)" since it extends toward the right-hand side of observer 10, and the positive Z axis ia marked "(down)" since it extends in a direction observer 10 would identify as "down".

In FIG. 2, each of the acoustical energy transducers shown in FIG. 1 is represented by a point in the coordinate system. The points representing these transducers are labelled with the same reference numerals used in FIG. 1. In addition to the coordinate location of each transducer in FIG. 2 is indicated in parentheses adjacent the point representing the transducer. Transmitter 18 is located at the head of an arrow marked LOS. This arrow, although not coincident with LOS 22 of FIG. 1, is so marked because the line between transmitters 18 and 20 is parallel to LOS 22 and therefore will have the same angular relationship to the coordinate system of FIG. 2 as actual LOS 22. Transmitter 18 is shown located at coordinate location ($X_A$, $Y_A$, $Z_A$). At the tail of the LOS arrow is transmitter 20, located at point ($X_B$, $Y_B$, $Z_B$).

The positions of the three receivers in assembly 24 have been chosen with coordinate locations which simplify the computation of positions of transmitters 18 and 20. Located at the origin of the coordinate system of FIG. 2 is receiver 26. The other two receivers are located in the X-Z plane at an X coordinate of $X_0$ and at Z coordinates of $\pm Z_0$. Receiver 30 appears at the point ($X_0$, 0, $-Z_0$). Receiver 28 appears at the point ($X_0$, 0, $Z_0$).

Emanating from transmitter 18 are three dashed lines $d_1$, $d_2$, and $d_3$. These lines represent a pulsed acoustical energy signal sent from transmitter 18 outward and received by each of the three receivers 26, 28, and 30. Since the propagation speed is essentially constant over the short distance between the transmitters and receivers, the length of these lines is proportional to the propagation time required for them to reach the receivers. Three lines $d_4$, $d_5$, and $d_6$ also emanate from transmitter 20. These lines are shown as dotted lines to distinguish them from the dashed lines representative of signals emanating from transmitter 18. They also terminate at the three receivers. These lines are representative of the distances between transmitter 20 and receivers 26, 28, and 30 respectively.

Using the apparatus as described in FIG. 1 and the geometry as shown in FIG. 2, the operation of a LOS determining system and the need for an accurate value of propagation speed in such a system may be explained.

The calculations necessary to transform the transit or propagation times into transducer coordinates and LOS direction cosines will now be described. A general expression defining the distance between two points in a Cartesian coordinate system is $$D_P{}_P{}^2 = (X_1 - X_2)^2 + (Y_1 - Y_2)^2 + (Z_1 - Z_2)^2 \qquad 1.$$

where $D_P{}_P$ is the distance between two points $P_1$ and $P_2$, the point $P_1$ has coordinates ($X_1$, $Y_1$, $Z_1$) and the point $P_2$ has coordinates ($X_2$, $Y_2$, $Z_2$). Utilizing this expression, the distance between a transmitter and the three receivers can be calculated from knowledge of their coordinate locations. For transmitter 18, as shown in FIG. 2, the distances $d_1$, $d_2$, and $d_3$ may be expressed as follows:

$$d_1{}^2 = X_A{}^2 + Y_A{}^2 + Z_A{}^2 \qquad 2.$$
$$d_2{}^2 = (X_A - X_0)^2 + Y_A{}^2 + (Z_A - Z_0)^2 \qquad 3.$$
$$d_3{}^2 = (X_A - X_0)^2 + Y_A{}^2 + (Z_A + Z_0)^2 \qquad 4.$$

By appropriate substitution and algebraic solution, the coordinates of transmitter 18 may be obtained in terms of the known and unknown distances:

$$X_A = [2d_1{}^2 - d_2{}^2 - d_3{}^2/4X_0] + [X_0{}^2 + Z_0{}^2/2X_0] \qquad 5.$$
$$Z_A = [d_3{}^2 - d_2{}^2/4Z_0] \qquad 6.$$

Using (5) and (6):
$$Y_A = [d_1{}^2 - X_A{}^2 - Z_A{}^2]^{1/2} \qquad 7.$$

However these coordinates are still expressed in terms of distances. As has been previously explained, the system measures transit times. A transit time may be converted into distance by the use of the expression $$d_i = C_N t_i \qquad 8.$$

where $d_i$ is the distance between a transmitter and receiver, $t_i$ is the time measured by the system for the pulse to be transmitted from the transmitter to the receiver along the path $d_i$, and $C_N$ is an assumed propagation speed of the signal. Using this well-known relationship and making substitutions into the equations for the coordinates of transmitter 18 yields $$X_A = C_N{}^2 [2t_1{}^2 - t_2{}^2 - t_3{}^2/4X_0] + [X_0{}^2 + Z_0{}^2/2X_0] \qquad 9.$$
$$Z_A = C_N{}^2 [t_3{}^2 - t_2{}^2/4Z_0] \qquad 10.$$
$$Y_A = [C_N{}^2 t_1{}^2 - X_A{}^2 - Z_A{}^2]^{1/2} \qquad 11.$$

The coordinates of rear transmitter 20 are established using similar equations. From these equations, direction cosines of the LOS may be computed using the computed transmitter coordinates and the known separation between them. These direction cosines are given by the expression $$A_X = X_A - X_B/S \qquad 12.$$
$$A_Y = Y_A - Y_B/S \qquad 13.$$
$$A_Z = Z_A - Z_B/S \qquad 14.$$

where $A_X$, $A_Y$, $A_Z$ are the direction cosines of the angle between the LOS and each of the coordinate axes, and S is the distance between helmet transmitters 18 and 20.

Figure 3:
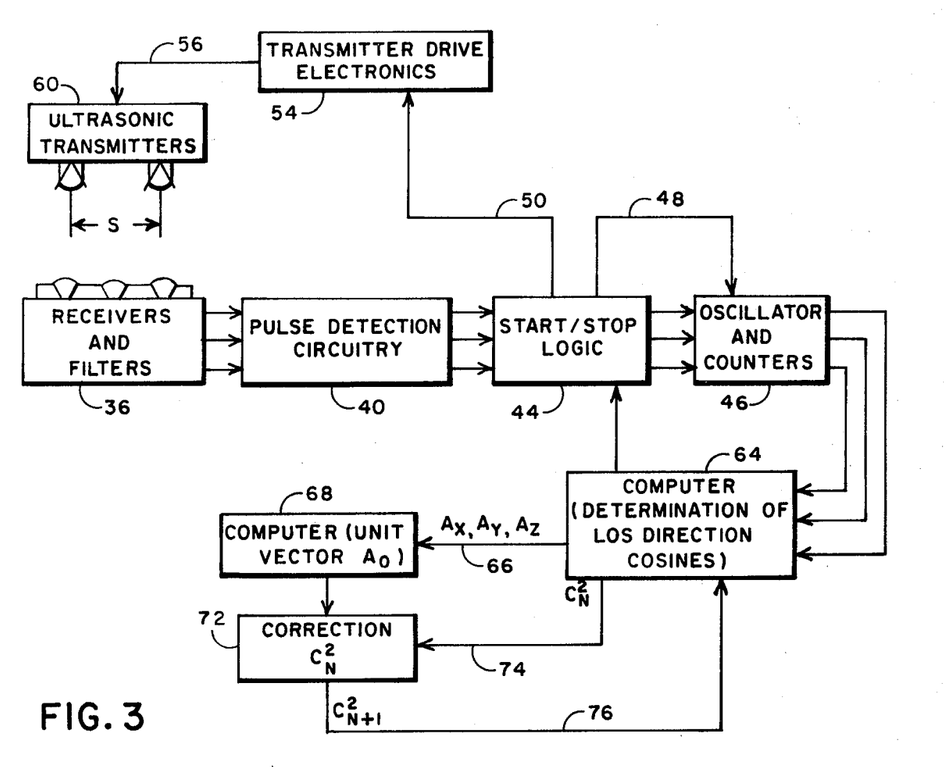
FIG. 3 is a simplified block diagram representation of an ultrasonic line-of-sight determining system in which the propagation speed determining apparatus of the present invention may be applied.

The direction cosines of the LOS may then be used by a system computer to control the pointing direction of weapons or visual aids such as low-light-level TV cameras or other optical sensors so that the weapons or aids are slaved to the observer's LOS. It is apparent from equations (9), (10), and (11) that knowledge of the propagation speed of acoustical energy is extremely important in the calculations made by an LOS determining system. Because the LOS determining system is often used in places where temperature and pressure vary significantly this propagation speed also varies by an amount objectionable in an LOS determining system. The present invention supplies this need with a method and means for obtaining a propagation speed of acoustical energy in the medium between the receivers and transmitters. FIG. 3 is a simplified block diagram of an LOS determining system of the type shown in FIG. 1, illustrating the function and connection of the propagation speed determining apparatus.

In FIG. 3, a rectangular block identified with reference numeral 36 represents acoustical energy receivers and associated filters used to identify signals received from the acoustical energy transmitters. At the top of block 36 are three annular sections which represent three receivers similar in function to the receivers 26, 28, and 30 shown in FIGS. 1 and 2. Receivers and filters block 36 functions to receive and filter the acoustical energy signals, and transmit the filtered signals to pulse detection circuitry 40. Three arrows connecting receivers and filters block 36 with pulse detection circuitry 40 represent connective links transmitting received and filtered pulses from the three receivers of block 36. Pulse detection circuitry 40 detects a precisely defined portion of each acoustical energy signal (for example, a certain peak or zero-cross) and generates a logic signal at one of its outputs upon such detection. Three outputs of pulse detection circuitry 40 are connected to start/stop logic block 44. The three logic signals transmitted to logic block 44 via the connections are used by logic block 44 to generate stop signals for each of three counters in an oscillator and counters block 46.

Each of these counters was previously started by a start signal from the start/stop logic. The start signals are transmitted to the oscillator and counters 46 through a connective link 48.

A signal which is precisely timed with the start signal sent to the oscillator and counters 46 is transmitted via a connection 50 which connects start/stop logic 44 to transmitter drive electronics 54. The transmitter drive electronics include a transducer excitation programmer which provides drive pulses for each transmitter and associated logic used to sequence the pulses for alternate excitation of the transmitters. The signal transmitted via connection 50 is used to actuate the transducer excitation programmer in transmitter drive electronics 54. The drive pulses are provided through a connective link 56 to an ultrasonic transmitters block 60. Ultrasonic transmitters block 60 has two appendages which represent transmitters mounted on the object whose orientation is being determined. The drive pulses received by transmitters block 60 drive pulse transformers within transmitters block 60.

When a drive pulse or train of pulses is provided to a pulse transformer associated with a particular transmitter, the transformer generates an excitation signal for the transmitter, which responds thereto by emitting several cycles of ultrasonic frequency acoustical energy. The emitted acoustical energy signal is sensed by the receivers of receivers and filters block 36, precisely detected by the pulse detection circuitry in pulse detection block 40. A stop pulse generated by start/stop logic 44 is used to stop the counters which were started in synchronization with transmitter excitation.

The result is that the counters measure transit times from one of the transmitters to the three receivers. Since the drive to the transmitter is sequenced, first one then the other of the transmitters will be excited. The information in the counters is provided to a computer 64 so that three transit times are recorded. The counters in oscillator and counter block 46 are then reset and are ready to record the transit times from the other transmitter. In this way, the six transit times necessary to determination of the coordinate locations of the transmitters with respect to the receivers are collected by the system of FIG. 3.

Computer 64 receives signals representative of the transit times measured by oscillator and counters 46 through a set of three connective links shown as arrows in FIG. 3. These signals are provided to computer 64 after each transmission and receipt of a pulsed signal from one of the transmitters 60. Therefore, two sets of three signals each are received by computer 64.

Computer 64 is programmed to solve equations of the form shown in expressions (9) – (11). These coordinates are calculated using a value for propagation speed, which is either an assumed nominal value for signals in the medium or a value which was used for the previous LOS computation performed by the system. In the subsequent discussion of propagation speeds appearing in this specification, the symbol $C_N$ shall refer to this assumed nominal value or value used by the system for a previous LOS calculation. On the other hand, the symbol $C_{N+1}$ shall refer to a propagation speed determined using the method or apparatus of the present invention. Utilizing this programming and the six signals received, computer 64 calculates coordinates for the front and rear transmitters of ultrasonic transmitters block 60. Computer 64 is also programmed with a signal whose value is representative of the distance S between the two ultrasonic transmitters. Once the six coordinates of the two ultrasonic transmitters 60 have been calculated by computer 64, these coordinates may be used in conjunction with the known distance S between the transmitters to calculate the direction cosines of the LOS of the observer.

It is apparent from inspection of equations (9) – (11) that a value for the square of the propagation speed of acoustical energy, $C_N^2$, is used for calculation of each of the six coordinate values used in calculating direction cosines. The present invention provides an accurate value of the square of the propagation speed for acoustical energy for use in this computation. A connective link 66 in FIG. 3 transmits signals $A_x$, $Z_y$, $A_z$ representative of computed direction cosines of the LOS to a computer block 68. These direction cosines have been calculated using propagation speed $C_N$. Computer block 68 computes a unit vector $A_0$ utilizing the direction cosines of the line of sight. The unit vector $A_0$ is defined by the expression $$A_0 = (A_x^2 + A_y^2 + A_z^2)^{1/2} \qquad 15.$$

It will be apparent from inspection of the equations for the direction cosines $A_x$, $A_y$, and $A_z$ that the unit vector $A_0$ is a fraction whose numerator is the calculated distance between transmitters 60 and whose denominator is the known distance S. In view of its calculation of $A_0$, computer block 68 may be said to generate a signal related to the known distance S utilizing the transit times and an assumed propagation speed. However, any signal from which the calculated distance between transducers could readily be obtained would be sufficiently "related to" the known distance for the purpose of the present invention.

If the value of propagation speed $C_N$ is accurate, the computed value of $A_0$ will be unity. If an error exists in the quantity $C_N$, it has been discovered that $A_0$, the unit vector length, will vary in a nearly proportional manner. Using this discovery, a simple iterative algorithm for propagation speed determination is $$C_{N+1}^2 = C_N^2 \, 1/(A_0) \qquad 16.$$

where $C_{N+1}$ is an improved value of propagation speed for use in a subsequent computation of line of sight.

Returning now to a description of FIG. 3, computer block 68 transmits a signal representative of the value of $A_0$ to correction circuitry 72. Correction circuitry 72 receives from a connection 74, a signal representative of the valve of $C_N^2$, the square of the assumed nominal or previously calculated propagation speed. Using equation (16), correction circuitry 72 generates a new value for propagation speed, $C_{N+1}$, and transmits a signal representative of $C_{N+1}^2$ on a connection 76 between correction circuitry 72 and computer block 64 for use in subsequent computation. In a typical system such as that diagrammed in FIG. 3, this calculation of direction cosines followed by computation of a new value of propagation speed need only be repeated once during each LOS computation, since LOS computations are closely spaced in time and use of equation (16) or a closely related algorithm results in a rapidly converging iterative solution for propagation speed.

Figure 4:
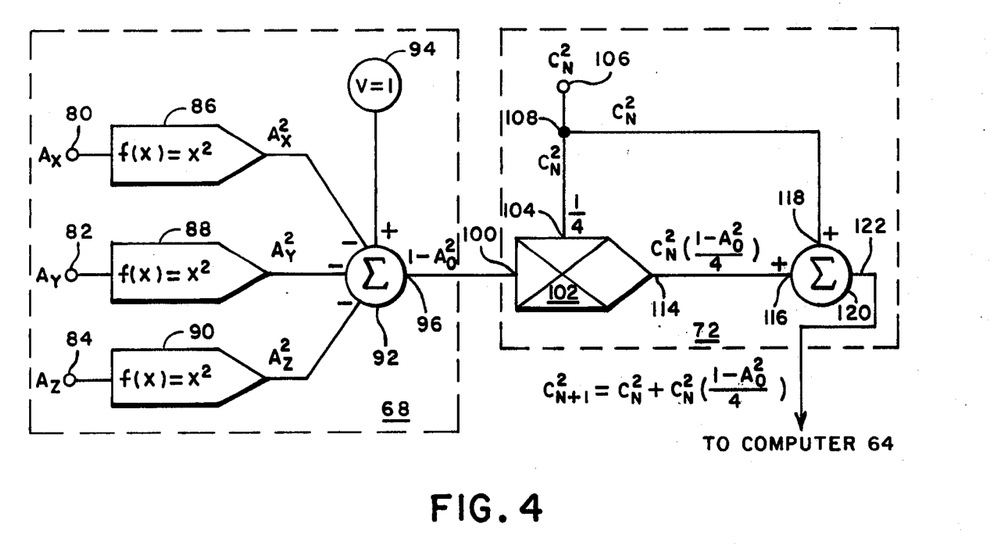
FIG. 4 is a block diagram illustrating one embodiment of the propagation speed determining apparatus of the present invention and the way in which it may be used to provide propagation speed values for a line-of-sight determining system.

FIG. 4 shows in more detail a block diagram of a particular embodiment of the propagation speed determining apparatus. At the left side of FIG. 4 are three input terminals 80, 82, and 84. Terminals 80, 82, and 84 receive signals representative of the direction cosines of the line of sight. Each terminal receives one of the cosine signals. For convenience and clarity of explanation, each terminal has been labelled with the symbol previously used to denote one of the LOS direction cosines. Thus input terminal 80 is labelled with $A_X$, representative of the X axis direction cosine, input terminal 82 is labelled with $A_Y$, representative of the Y axis direction cosine, and input terminal 84 is labelled with $A_Z$, representative of the Z axis direction cosine.

The direction cosine signals present at input terminals 80, 82, and 84 are supplied each to one of the three squaring circuits 86, 88, and 90. The squaring circuits 86, 88, and 90 function to produce output signals representative of the square of their received input signals. Squaring circuit 86 is connected to receive the signal from input terminal 80 and produces a signal representative of the square of that signal at its output. In a similar manner, squaring circuit 88 is connected to receive the signal present at input terminal 82 and square it, presenting the squared signal at its output. Finally, squaring circuit 90 is connected to input terminal 84. It receives the signal from input terminal 84, squares that signal, and presents a signal representative of the squared signal at its output.

The outputs of the three squaring circuits 86, 88, and 90 are connected to three negative polarity inputs of a four input summing junction 92. A fourth input which sums its received signal with a positive polarity is connected to a function generator 94. Summing junction 92 adds the negative magnitudes of signals received at its negative polarity inputs with the positive magnitudes of signals received at its positive polarity input. The output of function generator 94 is a signal representative of the integer one. Summing junction 92 has an output 96. At output 96 of summing junction 92, a signal equal to the quantity $(1 - A_0^1)$ is provided, with $A_0$ being defined as in equation (15). The circuitry of FIG. 4 to the left of output 96 is enclosed in a dashed line block designated 68. This relates it functionally to the system of FIG. 3. This portion of the FIG. 4 computes a value representative of the unit vector $A_0$.

In the specific embodiment of FIG. 4, the quantity $(1 - A_0^2)$ is calculated by the circuitry of block 68 to take advantage of two approximations which have been found to result in significant computation time saving in embodiments of this invention utilizing a digital computer.

The origin of these approximations shall be briefly described. As previously mentioned, equation (16) provides a useful algorithm for determination of an improved propagation speed value. Because propagation speed variations are small when compared to the speed itself, two approximations can be made. For small values of $\epsilon$ and $\alpha$ the following expressions are true:

$$(1 + \epsilon)^{1/2} \approx (1 + \epsilon/2) \qquad 17.$$
$$(1/1+\alpha) \cong (1 - \alpha) \qquad 18.$$

Using these two relationships, we define $(1 + \epsilon)$ as equal to $A_0^2$. This means $$\epsilon = A_0^2 - 1 \qquad 19.$$

and
$$(1+\epsilon)^{1/2} = (A_0^2)^{1/2} = A_0 \cong 1+[A_0^2-1/2] = [1+A_0^2/2] \qquad 20.$$

Using expression (18) and letting $1 + \alpha$ equal the quantity $(1 + A_0^2/2)$ $$\frac{1}{A_0} \cong \frac{1}{\frac{1+A_0^2}{2}} \cong 1 - \frac{A_0^2-1}{2} = \frac{3-A_0^2}{2} \qquad (21)$$

Substituting this approximation into equation (16) gives
$$C_{N+1}^2 = C_N^2 (3 - A_0^2/2) \qquad 22.$$

Using such an approximation will substantially reduce the calculation time for the algorithm in digital computer mechanizations of this invention.

In practice it has been found that due to significant sensitivity of the system to data scatter or noise, the system output using expression (22) may exhibit small oscillations around a mean value. To eliminate this, the propagation speed determination correction for a single iteration was halved. This was done by multiplying the value of $\alpha$ used in relationships (21) and (22) by one-half. The resultant algorithm used for propagation speed determination is $$C_{N+1}^2 = C_N^2 (5-A_0^2/4) = C_N^2 + C_N^2 (1-A_0^2/4) \qquad 23.$$

where
$$A_0^2 = A_x^2 + A_y^2 + A_z^2$$

This basic algorithm is mechanized in apparatus shown in block diagram form in FIG. 4. It will be well understood that any algorithm essentially using the relationship defined by equation (16) will be successful in achieving improved propagation speed values.

Returning now to a description of FIG. 4, the output 96 of summing junction 92 transmits a signal representative of the value $1-A_0^2$. Output 96 is connected to a first input 100 of an electronic multiplier 102. Multiplier 102 has a second input 104. The fraction one-quarter appearing to the right of input 104 indicates that the product obtained by multiplier 102 in multiplication of the signals at inputs 100 and 104 is scaled by a factor of one-quarter. A terminal 106 is connected to input 104. Terminal 106 is provided with a signal representative of $C_N^2$, the square of a nominal or previously used propagation speed value. A first value for $C_N^2$ would normally be pre-programmed or pre-set into the system. Subsequent values might be obtained during successive LOS computations.

Intermediate terminal 106 and input 104 is a junction point 108. The signal representative of $C_N^2$ is presented at input 104 and a signal representative of the quantity $1 - A_0^2$ is presented at the input 100 of electronic multiplier 102.

Electronic multiplier 102 functions to multiply the received signals, adding a scale factor of one-quarter. Multiplier 102 has an output 114 at which an output signal representative of the quantity $C_N^2$ multiplied by $1 - A_0^2/4$ is present. Output 114 is connected to a positive polarity input 116 of a summing junction 120, a second positive input 118 of which is connected to junction point 108. Input 118 receives a signal representative of $C_N^2$. Summing junction 120 has an output 122. At output 122, a signal representative of the sum of $C_N^2$ and the quantity $C_N^2 (1 - A_0^2/4)$ will be generated.

This is a new propagation speed $C_{N+1}^2$ which may then be transmitted to the computer 64 for use in a more accurate determination of LOS direction cosines. The portion of the circuitry in FIG. 4 from the input 100 to the output 120 is surrounded by a dashed line block 72. This identifies it as performing the function of correction circuitry 72 shown in FIG. 3, and relates it to the system of FIG. 3.

In practice, a first determination of LOS direction cosines accomplished by computer block 64 of FIG. 3 will normally be followed by determination of a more accurate propagation speed, then by re-determination of direction cosines utilizing the new propagation speed. If LOS computations are closely spaced in time, only one iteration may be required. On the other hand, if measurements are only occasionally taken, three or four recomputations may be required to obtain an accurate LOS value.

FIG. 4 has shown a block diagram of one embodiment of the propagation speed determining apparatus. The invention may also be mechanized by use of a properly programmed digital computer in combination with certain system elements to generate improved propagation speed values.

Figure 5:
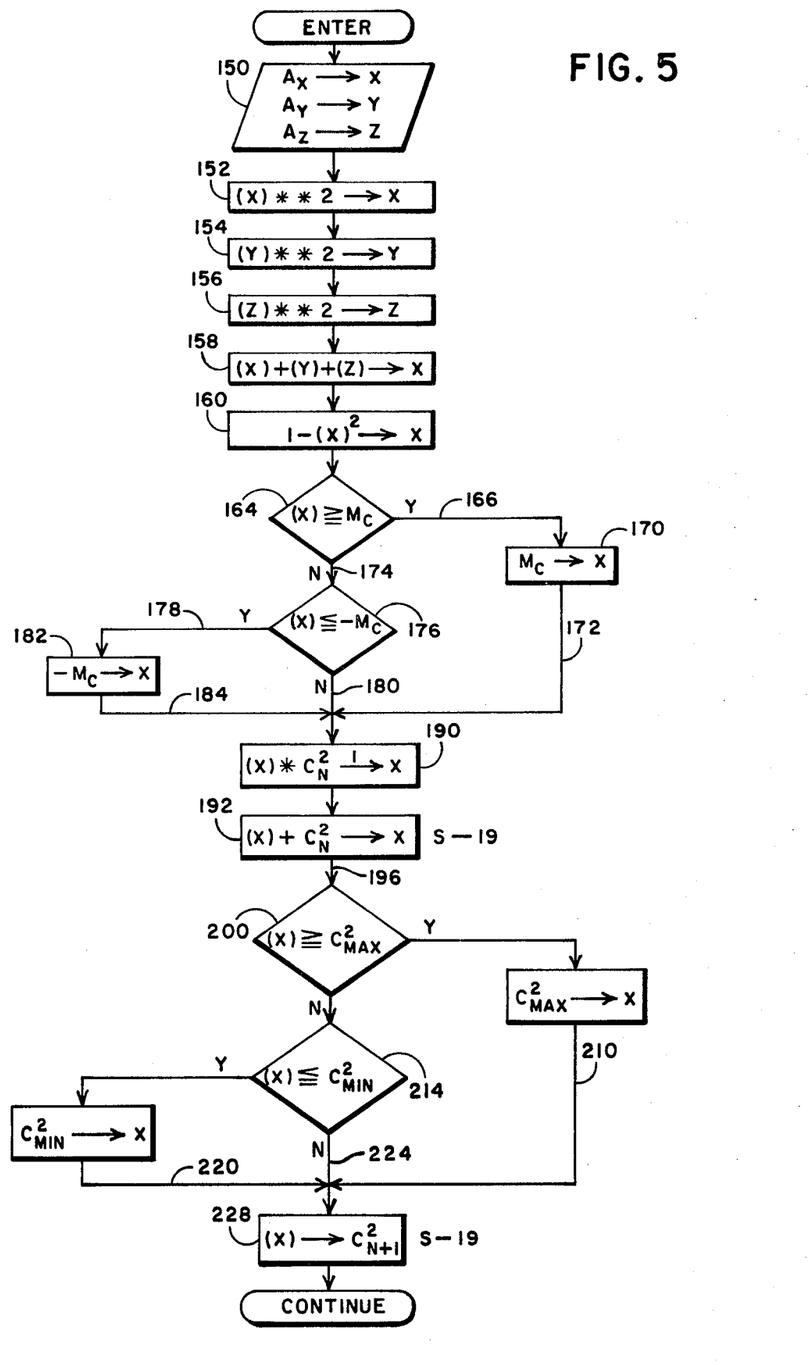
FIG. 5 is a flow chart of a propagation speed correction algorithm for use in a computer utilizing the method of the present invention.

FIG. 5 illustrates a flow chart for a propagation speed determining algorithm. The flow chart may be used for programming a digital computer to perform the calculations performed by the circuitry shown in FIG. 4. The algorithm in FIG. 5 contains features not shown in the mechanization of FIG. 4. The maximum and minimum values of the propagation speed squared are limited in the flow chart of FIG. 5 by a decision making loop. This feature keeps certain failures in the propagation speed determining system from causing the LOS determining system to completely lose its utility. For example, if an electronics failure caused a malfunction in block 68, the block which computes the unit vector $A_0$, the system might generate a value of the square of the propagation speed totally unrelated to the actual value. The decision loop shown in the flow chart of FIG. 5 prevents this problem from rendering the LOS determining system completely useless. The second feature achieved using the flow chart shown in FIG. 5 is limitation of the maximum percentage change in propagation speed accomplished by one iteration. This feature ensures the propagation speed value will converge smoothly to the actual propagation speed.

In one embodiment of an LOS determining system using an algorithm similar to that of FIG. 5, the propagation speed squared $(C_{N+1})^2$ and the percentage change during one iteration (m) were defined as follows:

$$C_{N+1}^2 = \begin{array}{ll} C_{MAX}^2; & C_N^2 + mC_N^2 \geq C_{MAX}^2 \\ C_N^2 + mC_N^2; & C_{MIN}^2 < C_N^2 + mC_N^2 < C_{MAX}^2 \\ C_{MIN}^2; & C^2 + mC^2 \leq C_{MIN}^2 \end{array}$$

and $$m = \begin{array}{ll} M_C; & 1-A_0^2/4 \geq M_C \\ 1-A_0^2/4; & 1-A_0^2/4 < M_C \\ -M_C; & 1-A_0^2/4 \leq M_C \end{array}$$

where
$C_{MAX}^2 = 1.378 \times 10^{-6}$ ft$^2$/μsec$^2$
$C_{MIN}^2 = 1.0161 \times 10^{-6}$ ft$^2$/μsec$^2$
$M_C = 0.001$ Proceeding now to a description of FIG. 5, a parallelogram labelled 150 represents loading of the direction cosine values $A_X$ into an X register, $A_Y$ into a Y register, and $A_Z$ into a Z register. These direction cosine values will be available from a computation using the last determined propagation speed value. The first operation performed in the flow chart is labelled 152. It represents squaring of the contents of the X register and loading of that squared value into the X register. This will provide the X register with the expression $A_X^2$. Operations labelled 154 and 156 are identical in nature to operation 152 calculating and loading the values $A_Y^2$ $A_Z^2$ into their respective Y and Z registers. An operation 158 in the flow chart takes the contents of each of the three registers X, Y, and Z, sums them and loads the sum into the X register. This effectively loads the X register with the quantity $A_0^2$.

The next operation is labelled 160. This amounts to calculating 1 minus the contents of the X register, that is, $1 - A_0^2$, shifting the binary point two places to the right which, since this is a binary system, effectively divides by four, and loading the result into the X register. The operations thus far produce a signal similar to the signal at the output of summing junction 92 in FIG. 4 except that the shift of two has already multiplied $1 - A_0^2$ by one-quarter. The next step or operation in the flow chart is a decision operation 164, which determines whether or not the contents of the X register are equal to or greater than $M_C$. As previously described by equation, $M_C$ is the maximum change allowed in one iteration by the propagation speed determining method shown in FIG. 5. If the contents of the X register are greater than or equal to $M_C$, $M_C$ is entered in the X register. A flow arrow 166 indicates that in the case of a YES decision, where the contents of X are greater than or equal to $M_C$, the next step in the flow chart will be dictated by following arrow 166. Arrow 166 leads to an operation 170. Operation 170 consists of loading the value $M_C$ into the X register. A flow arrow 172 then merges with the flow arrows followed in the event of a NO decision at operation 164.

If a NO decision is made at decision operation 164, a flow arrow 174 defines the next operation. Flow arrow 174 is connected to a diamond representing a decision operation 176. Whereas decision operation 164 provided an upper bound to the change in propagation speed resulting from the iteration, the decision operation 176 provides a lower bound. Decision operation 176 determines whether the contents of the X register are less than or equal to $-M_C^2$. If the decision is NO, a flow arrow 180 is followed. If the decision is YES, the contents of the X register are more negative than the quantity $-M_C$. In that case arrow 178 is followed to an operation 182, which loads the quantity $-M_C$ into the X register. A flow arrow 184 then returns the program to arrow 180, and arrow 172.

Flow arrows 172, 180, and 184 direct the program to an operation identified by reference numeral 190. This operation takes the contents of the X register, multiplies them by a value $C_N^2$, a previously determined or assumed propagation speed, and loads the product into the X register. A shift of one place to the right is required at this point merely to keep the binary point in the right place in the multiplication process. A flow arrow runs from operation 190 to an operation designated by reference numeral 192. Operation 192 takes the contents of the X register, adds the quantity $C_N^2$, and loads the result into the X register. As indicated by the designation S-19 to the right of operation 192, a substantial shift of binary point is necessary to line up the binary points in the contents of the X register and $C_N^2$ to perform the addition operation. The new value of propagation speed has now been calculated. It is equal to $C_N^2$ plus the quantity $(1-A_0^2/4) C_N^2$. The remainder of the flow chart deals only with the feature which limits the minimum and maximum values which the square of the propagation speed may assume.

This portion of the flow chart operates in essentially the same way as the portion which bounded the percentage change in propagation speed for one iteration. A decision operation 200 determines whether or not the contents of the X register are greater than or equal to $C_{MAX}^2$. If the decision is YES, the value $C_{MAX}^2$ is entered in the X register using a leg of the flow chart marked 210. If the decision is NO, the contents are checked for minimum value in a decision operation 214. If the contents of the X register are less than $C_{MIN}^2$, $C_{MIN}^2$ is loaded into the X register via a leg of the flow chart identified as 220. If not, a flow arrow 224 defines the next step in the method. Legs 210, 224, and 220 converge at an operation block identified by reference numeral 228. This loads the contents of the X register into a register labelled $C_{N+1}^2$ which is a new calculated value of propagation speed. This value could then be used in a system of the type illustrated by FIG. 3 to recalculate direction cosines of the LOS in computer 64.

While the flow chart shown is refined and specific, it will be apparent to those skilled in the art that any flow chart or process corresponding to a flow chart which mechanizes a determination of propagation speed by multiplying a previously assumed nominal speed by the ratio of a computed length in the system to a known length in the system achieves the desired result. In addition, it is not necessary that the propagation speed determining apparatus be applied in an LOS determining system. Any system which uses acoustical energy signals to make measurements of distance or velocity and requires a propagation speed value for its operation, might apply the present invention.

The method and apparatus for propagation speed determination as shown in FIGS. 4 and 5 operates without the use of receivers and transmitters separate from the primary system transducer used for distance or orientation measurement. It also operates without the use of complex external circuitry used in the prior art for determination of propagation speed.

Thus it is apparent that there has been provided in accordance with the invention a method and apparatus for propagation speed determination that fully satisfies the objects, aims, and advantages, set forth above. While the invention has been described by the use of specific embodiments thereof, it will be evident to those of skill in the art that many alternatives, modifications and variations are available in light of the foregoing description. Accordingly, this is intended to embrace all such alternatives, modifications, and variations as fall within the spirit and broad scope of the appended claims.

What is claimed is:

1. An apparatus which determines relative spatial orientation of two objects in a medium utilizing acoustical energy transducers positioned on each object, means for transmitting acoustical energy from transducers on one object to transducers on the other, means for measuring transit times required for propagation of acoustical energy between transducers on one object to transducers on the other object, and means for calculating relative spatial orientation using the transit times and an assumed propagation speed in the medium, the improvement which comprises:
   a. a first pair of transducers spaced a known distance from one another and affixed to one of the objects;
   b. first computing means for generating an output signal related to the known distance utilizing said transit times and said assumed propagation speed;
   c. signal generating means for generating an output signal whose value is a mathematical function of the known distance; and
   d. second computing means, responsive to the output signals generated by said first computing means and said signal generating means, for calculating therefrom a corrected propagation speed for acoustical energy in the medium.

2. The apparatus of claim 1 wherein said first computing means generates a signal proportional to the distance between said first pair of transducers which would be obtained by computation utilizing said assumed propagation speed and the time required for propagation of acoustical energy between said first pair of transducers and the transducers on the other object.

3. The apparatus of claim 2 wherein said second computing means calculates said corrected propagation speed by multiplying said assumed propagation speed by a value approximately proportional to the square root of the ratio of the first computing means output signal to the signal generating means output signal.

4. The apparatus of claim 1 wherein said second computing means calculates said corrected propagation speed substantially in accordance with the equation
$$V_s^1 = V_s (1/A_0)^{1/2}$$
where
   $V_s^1$ = the corrected propagation speed;
   $V_s$ = the previous assumed value of propagation speed; and
   $A_0$ = a unit vector length calculated by said first computing means using computed coordinates for said first pair of transducers.

5. In a line-of-sight determining system utilizing signal generating transducers mounted on a helmet and reference frame, including means for sending signals between the transducers and means for calculating direction cosines of the line-of-sight based on propagation times for signals transmitted between said helmet and said frame and an assumed signal propagation speed, the improvement which comprises:
   a. signal generating means for generating a signal representative of the square of a unit vector length utilizing the direction cosines so calculated;
   b. computing means having an input, for correcting the square of said assumed signal propagation speed by multiplying said assumed signal propagation speed by the inverse of a value supplied as an input to said computing means; and
   c. means for supplying the value represented by the signal generated by said signal generating means at the input to said computing means.

6. The apparatus of claim 5 wherein said signal generating means generates a signal having a value representative of the quantity $(3-A_0^2/2)$ where
   $A_0^2$ = the sum of the squares of said calculated direction cosines of the line of sight.

7. The apparatus of claim 5 wherein said signal generating means generates a signal having a value representative of the quantity $(5-A_o^2/4)$ where
$A_o^2 =$ the sum of the squares of said calculated direction cosines of the line of sight.

8. A method of improving the accuracy of a nominal speed of sound value for use in a sonic energy relative orientation determining system having transducers mounted a known distance apart on a first object whose orientation is to be determined and three transducers mounted in known orientation on a second object with respect to which the orientation of the first object is to be determined, which comprises the steps of:
 a. calculating the distance between the transducers on the first object using transit times for signals transmitted between the transducers mounted on the first and transducers mounted on the second object and a nominal speed of sound value;
 b. dividing said calculated distance by said known distance; and
 c. correcting said nominal speed of sound by an amount approximately proportional to the square root of the quotient obtained by said division.

9. The method of claim 8 wherein the step of correcting said nominal speed of sound includes the substeps of
 a. multiplying the square of said nominal speed of sound value by a number proportional to $(3-A_o^2/2)$ where $A_o$ is the quotient obtained by said division;
 b. calculating the square root of the product obtained by said multiplication;
 c. dividing said calculated distance by said known distance; and
 d. correcting said nominal speed of sound by an amount approximately proportional to square root of the quotient obtained by said division.

10. The method of claim 8 wherein the step of correcting said nominal speed of sound includes the substeps of
 a. multiplying the square of said nominal speed of sound value by a number proportional to $(3-A_o^2/2)$ where $A_o$ is the quotient obtained by said division; and
 b. calculating the square root of the product obtained by said multiplication.

11. Apparatus for determining the relative spatial orientation of two objects in a medium comprising, in combination:
 a. first and second acoustical energy transmitters mounted on a first of the objects a predetermined distance apart;
 b. acoustical energy receiving means mounted on a second of the objects and operable to receive acoustical energy transmitted from said first and second acoustical energy transmitters;
 c. timing means connected to said acoustical energy receiving means and to said first and second acoustical energy transmitters to produce a first signal indicative of the transit time of the acoustical energy between said first and second acoustical energy transmitters and said acoustical energy receiving means;
 d. first computing means connected to said timing means to receive the first signal at a first input and, at a second input, a second signal which is, at least, approximately indicative of the propagation speed of the acoustical energy in the medium, said first computing means producing an output signal which is a function of the spatial orientation of the two objects based upon the first and second signals and the predetermined distance between said first and second acoustical energy transmitters;
 e. second computing means connected to said first computing means to receive the output signal therefrom and to produce an output signal which varies with any error in the second signal;
 f. correction means having a first input connected to said second computing means to receive the output signal therefrom and a second input connected said first computing means to receive the second signal, said correction means producing an output signal which, if an error in the second signal existed, is more nearly indicative of the propagation speed of the acoustical energy in the medium than the second signal; and
 g. means connecting the second input of said first computing means to receive the output signal of said correction means.

* * * * *